May 3, 1938.  W. F. OCENASEK  2,116,123
JIGSAW
Original Filed Nov. 16, 1935   2 Sheets-Sheet 1

INVENTOR
William Ferdinand Ocenasek
BY
Albert F. Nathan
ATTORNEY

May 3, 1938.  W. F. OCENASEK  2,116,123
JIGSAW
Original Filed Nov. 16, 1935   2 Sheets-Sheet 2
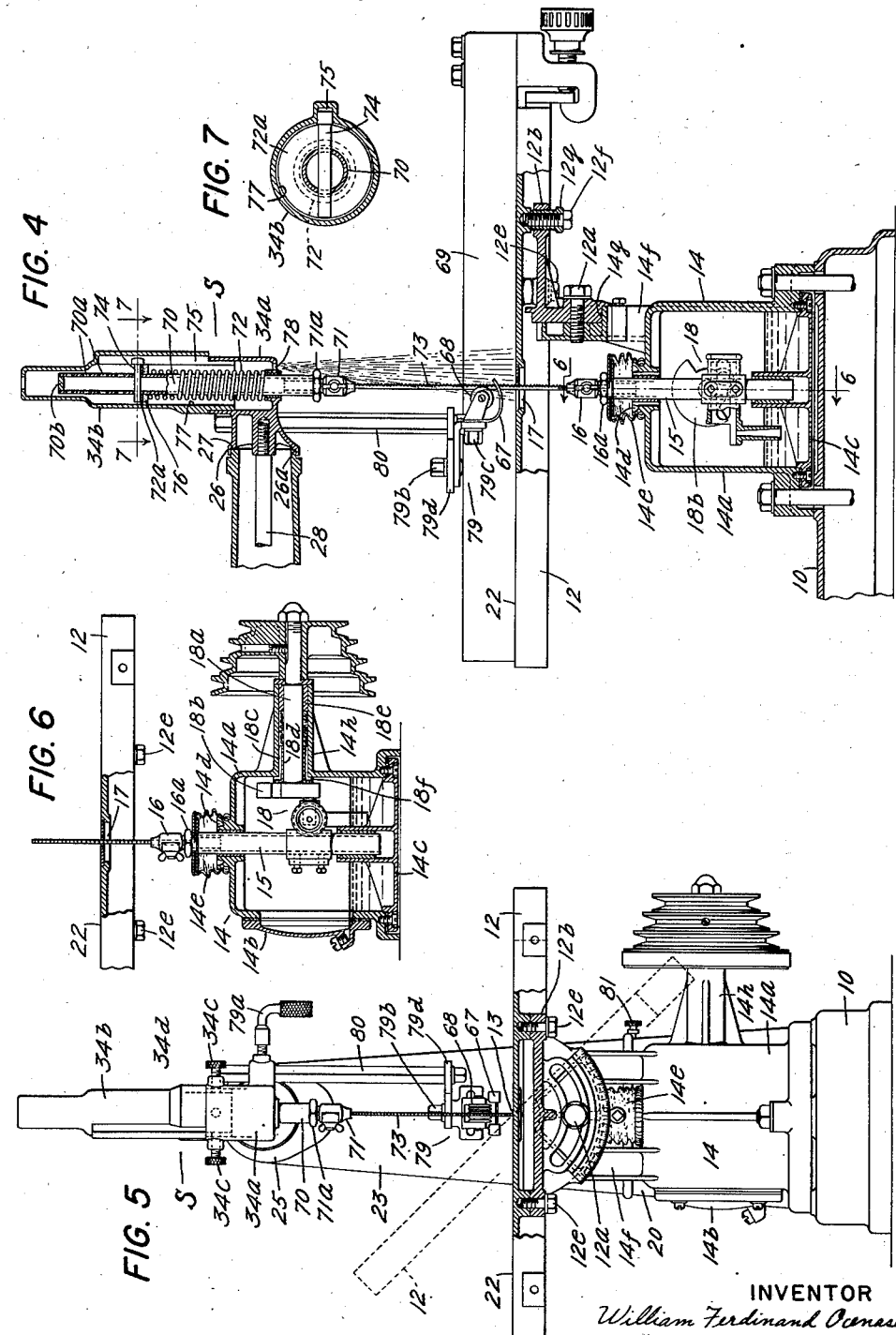
INVENTOR
William Ferdinand Ocenasek
BY
Albert F. Nathan
ATTORNEY Patented May 3, 1938

2,116,123

UNITED STATES PATENT OFFICE 2,116,123

JIGSAW

William Ferdinand Ocenasek, Plainfield, N. J., assignor to Walker-Turner Company, Inc., Plainfield, N. J., a corporation of New York Original application November 16, 1935, Serial No. 50,119. Divided and this application July 17, 1936, Serial No. 91,124

10 Claims. (Cl. 29—74)

The present invention relates to improvements in machine tools and is a division of my application Ser. No. 50,119, filed Nov. 16, 1935.

It has for a primary object to render available a machine tool which includes the combined functions of a number of cooperating machines and which may be readily converted from one type of machine to another with the ease and rapidity essential in certain arts.

In the production of printing plates, for example, an operator frequently is obliged to rout out an area or section from the top of a combined wood and metal plate and then trim off or remove a full section of the plate. Heretofore, operations of that character required two machines, one for sawing and one for routing and in consequence a great amount of time was consumed in moving the work from one machine to another. With the aid of the present invention, however, routing and sawing, and analogous operations may be performed upon the one machine without idle or wasted time between operations.

A further object of this invention is to provide a machine capable of performing any of the above mentioned types of operations on large workpieces and in which the tools are firmly supported under all conditions of normal usage.

Still another object of the present invention is to render available a machine tool having upper and lower cooperating tool operating mechanisms and in which provision is made for the quick and easy replacement of one of the mechanisms by one adapted to perform a particular character of operation different from that or those performed by the other mechanisms.

In attaining the objects of the invention it is proposed to provide a relatively long base member with a work support adjacent one end thereof, and provide under the work support power driven tool operating mechanism, such as jig-saw mechanism. The other end of the base member supports an over-arm which extends forward and overlies the work support, and is provided at its free end with a removably mounted tool head adapted to cooperate with the mechanism below the work support.

A further aim of the present invention is to render available a jig-saw operating mechanism constructed upon the unit principle devoid of extraneous parts and fittings difficult to machine, assemble and to maintain in perfect alignment, and to construct such a unit, with a single casing which, apart from a cover and an inspection plate, provides all of the bearings for the moving parts, as well as the supporting surfaces for seating a tiltable work table to the end that all of the bearings, surfaces etc. may be formed upon and in a single element and thus insure proper and permanent alignment of the several related and cooperating parts of the jig-saw mechanism.

By way of additional refinement, it is a further aim of the invention to provide a tiltable work table, tiltable on transverse axes. One of the planes of tilt being arranged to afford a large angular movement in the plane of the saw to each side of the normal horizontal plane, and the other plane of tilt being transverse to the plane of the saw, primarily for leveling purposes.

The invention also proposes to provide an improved mechanism for holding saw blades of various lengths and which likewise is constructed as a unit and adapted to be detachably mounted to the machine frame in cooperative relation with the saw operating mechanism below the work table. For performing one type of operation the arm may have mounted thereon an attachment designed to cooperate with the tool operating mechanism below the table, while for another type of operation, an attachment, such as a router, may be mounted upon the arm which may be operated independently of the mechanism below the table.

The router attachment above mentioned, consists of a power driven rotary tool useful for recessing, grooving, carving etc. The invention proposes an assembly which may be conveniently constructed and mounted in a manner assuring vibrationless operation and highly accurate work, as a unitary mechanism and which may be pivotally mounted upon the free end of a laterally movable arm of the machine. Such a mechanism is disclosed and described more completely in my copending application.

The arm member and the removable tool head may be swung laterally over the entire surface of the work table or to a point outside of the surface and firmly clamped in a predetermined radially adjusted position. The swinging feature of the arm is useful not only in performing operations with the routing assembly but is highly advantageous when using a saber blade saw in the tool operating mechanism mounted below the work table. The ability to swing the over-arm and attached tool head out of the way in the mounting or removing of a workpiece, greatly facilitates the sawing operation, particularly in confined or enclosed areas.

Another object of the present invention is to provide a combination machine with means carried by each removable head adapted to cooperate with the tool operating mechanism below the table to the end that certain types of tooling operations may be performed by the mechanism below the table without necessarily removing or substituting any particular head upon the overarm. In achieving that end it is proposed to equip each removable head unit with a bracket member with bearing surfaces complemental to those provided at the free end of the arm, and also with a means for attaching an extensible presser foot and back stop. The back stop cooperates with the saw blades and gives the necessary support thereto at the rear, while the pressor foot overlies the work and exerts a downwardly acting force thereon to keep the work from vibrating or jumping out of the operator's hands. Thus, if the machine is equipped with a routing head, it may be operated as a sawing machine or as a routing machine depending upon the nature of the operation it is desired to perform.

Still a further object of the present invention is to render available a jig-saw machine capable of adjustment for blade length and tension so that a user may not only use various lengths of blades at his disposal but adjust the spring tension of his machine to suit the particular requirements of the blade or of the character of work. For example, a user may desire to cut with a very fine saw. The spring tension on the saw must not be so great as to break it as soon as the machine is started. If the saw blade is relatively short, the spring tension should not be any greater than if the saw blade is relatively long. For heavier weight blades, greater tension is required to keep them from yielding under the heavier service to which they are subjected.

To meet these varied demands it is proposed to provide relatively long and hollow saw operating plungers and equip each with hollow chucks through which the ends of the blade may pass and be gripped at selected regions intermediate the ends. Thus, blades of different lengths may be used merely by allowing the excess length to project through the chucks into the plungers.

In order to regulate the tension on the blades it is proposed to provide the spring retracted plunger with a series of apertures uniformly spaced from one end, in which a key member may be selectively inserted. The key member serves as an abutment against which the force of the spring operates and the adjustment of the key from one hole to the next has the effect of changing the tension of the spring. It will be noted also that if a predetermined spring tension is desired on blades of different lengths, the adjustment of the key from one hole to the next, has the effect of shifting the plunger bodily axially thereby bringing the chucks closer together or moving them further apart, as the case may be, without changing spring tension. This feature of the invention is highly advantageous as it provides an economical manner of using odd lengths of blades that are too short to pass completely through the chucks into the plungers.

Occasionally, certain sawing operations require that the plane of the saw be turned, either before the operation is started or after it is partly completed. To effect this adjustment in an easy manner it is proposed to form the jig-saw head bracket in two relatively adjustable parts. One part is secured to the over-arm and provides the lower bearing for the plunger and also a recess in which the movable cover seats. The bracket cover encloses the upper portions of the spring and plunger and is provided with guide means which normally prevents the plunger and saw from rotating. When an adjustment of the plane of the saw is required the entire cover is unclamped and moved angularly and then reclamped in position. This operation turns the spring, plunger, chuck and saw as a unit the required distance, it is then only necessary to loosen the jam nut on the lower chuck and turn it a corresponding amount. The saw guide and presser foot mechanisms are likewise capable of adjustment to suit the angular position of the saw.

It is particularly important in a jig-sawing operation to keep the chips and saw-dust away from the saw blade so as to give the operator a clear view of the line on which he is working. Heretofore, auxiliary fans, rubber tubing connected with a source of air, etc., were employed for this purpose, which were frequently in the way, non-durable and generally unsatisfactory. The present invention further undertakes to remedy the defects of the prior blowers by constructing the reciprocable saw plunger as a piston, the housing therefore being so designed that on each stroke, a blast of air is discharged through a nozzle in the housing against the workpiece in the region surrounding the saw. In this way the chips and dust are automatically removed and the working area kept clear. The moving plunger below the work table is kept clean of the blowing chips and other dirt by an accordion type dust-boot that completely surrounds the plunger below the chuck.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 of the drawings illustrates a machine tool embodying this invention.

Fig. 4 is a detail view of the jig-saw head attachment and its cooperating mechanism.

Fig. 5 is a front view thereof.

Fig. 6 is a sectional view along lines 6—6 of Fig. 4.

Fig. 7 is a sectional view along lines 7—7 of Fig. 4.

Figure 1:
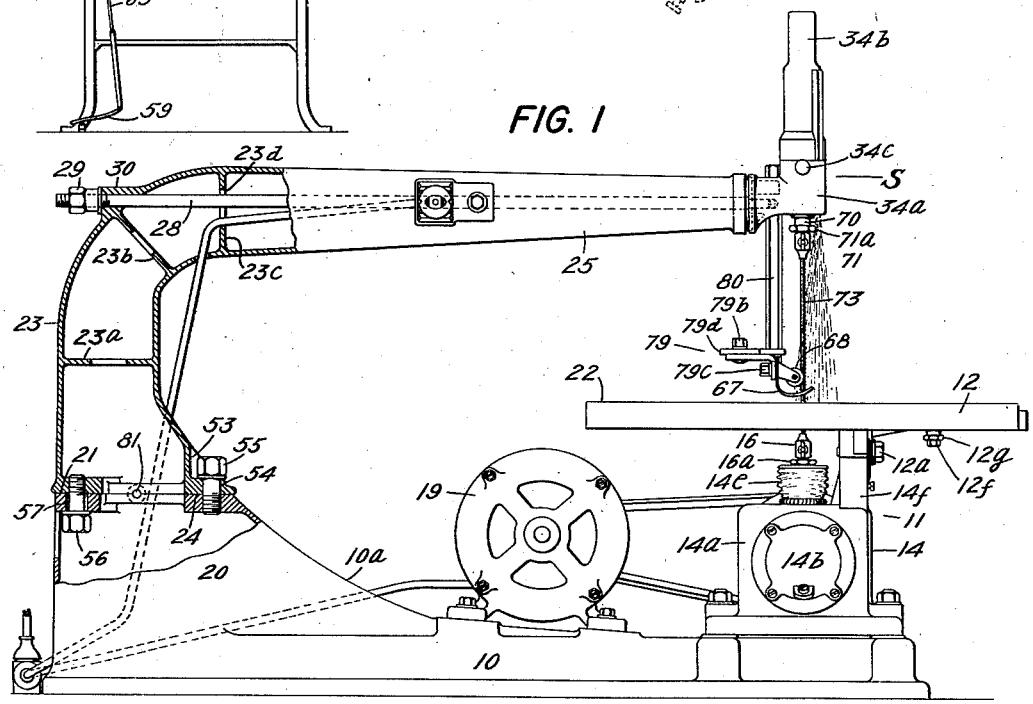

Referring to Figure 1 of the drawings, the machine there illustrated as a jig-saw comprises a base member 10 from which rises a support 11 that carries at its upper end a work table 12. The table 12 is pivotally mounted to swing about a horizontal axis 13, and overlies a power driven tool operating mechanism 14. The mechanism 14 comprises a reciprocable plunger 15 which is provided at its upper end with a chuck 16 suitable for the holding of a file, saw blade or other tool that operates through an opening 17 in the work table. The plunger 15 is reciprocated through the medium of a crank mechanism 18 which in turn is propelled by an electric motor 19 also mounted upon the base 10 below the normally horizontal plane of the table 12.

An important feature of the invention resides in the construction of the housing 14a of the mechanism mounted below the table. As shown in Figs. 4, 5 and 6 the housing 14a is a one piece unit, except for an inspection plate 14b and a bottom insert 14c, in which are provided bushed bearings for the upper and lower ends of the plunger 15 and for the crank mechanism 18. Upon the upper surface of the housing and surrounding the plunger 15 there is provided an oil collecting cup 14d integrally formed with the housing 14a which has two oppositely disposed ducts communicating with the interior of the housing. When the unit is completely assembled, the housing is a reservoir for the lubricant which keeps the moving parts, including the crank shaft, well oiled through the medium of a combined splash and squirt system, and any oil that is wiped off the plunger 15 upon its down stroke collects in the oil cup 14d and is drained back into the reservoir. The under side of the oil cup is under-cut for the purpose of securing thereto one end of an accordion type dust boot 14e, the other end of which is attached to the end of the plunger 15. The crank shaft 18a, is counterbalanced as at 18b, and is lubricated through a groove 18c in the upper portion of a bushing 18d. A felt padding is inserted between the ends of bushings 18d and 18e which keeps the oil from draining completely through and out the pulley side of the casing. The excess oil is drained back to the reservoir through a lower groove 18f.

The housing 14a is also provided with an upstanding portion 14f, amply ribbed and reinforced, having a stepped upper bearing surface 14g arcuately formed and upon which the tilting table seats. The axis of the arcuate seating surface is substantially coincident with the plane of the working surface to facilitate making accurate angle cuts. Above the stepped surface 14g, table clamping means in the form of a threaded hand screw 12a is provided which operates through an arcuate slot in the table supporting bracket 12b. The table 12 has a three-point bearing upon the bracket 12b and clamped at those points by two screws 12e and screw 12f which passes through an adjustable sleeve 12g. By adjusting the sleeve 12g in or out the table 12 may be perfectly aligned, or when necessary, tilted slightly in a plane transverse to its normal direction of tilt and locked by the screw 12f.

The pulley side of the housing 14a has an integrally formed extension 14h, ribbed and reinforced to withstand the lateral pull of the drive belt and the variable forces of the crank mechanism 18 inside of the casing.

Thus, it will be seen that by constructing the part 14a in one piece, a great many tooling operations have been eliminated, and there are no attached parts that can possibly get out of adjustment. The lower plate 14c, provides the lower bearing for the plunger 15 as well as seals the casing against leakage, is assembled and reamed in place to obtain the correct alignment, and since the casing proper projects over and beyond that part, the holding screws are out of sight when the unit is mounted in place upon the base and thus preventing any opportunity for misadjustment.

The rear portion of the base 10 is elevated as at 20 and the upper surface 21 of the elevated portion machined flat in a plane parallel with but below the work surface 22 of the table 12. An over-arm 23, is provided with complemental bearing surfaces 24 adapted to seat upon the surface 21 of the base, and a relatively long forwardly extending portion 25 which overlies the work surface 22 of the table 12.

Normally, the radial position of the axis of the radially extending portion 25 of the arm will intersect the axis of the reciprocable plunger 15, as that is the position best suited for a large number of operations that may be performed upon this machine.

The free end of the over-arm is adapted to carry any one of a number of removable tool heads, the head S illustrated in Figure 1 of the drawings being a jig-saw head. The interchangeability of tool heads is rendered possible by constructing each head as a unitary assembly, and providing each assembly with a standardized socket portion 26 which is adapted to fit over a complementally formed end portion 27 of the over-arm. The perpendicularly arranged bearing portions 26 and 27 are preferably circular so that the head may be adjusted angularly thereon. When the desired adjustment has been made the attached head is clamped firmly in position by means of a clamp bolt 28. The nut 29 of the bolt seats against a shoulder 30 at the rear of the over-arm, while the shank thereof passes through the hollow portion 25 and has a threaded engagement with the selected head at a point concentric with the bearing surfaces 26 and 27. The clamping action of the bolt, by this arrangement, is exerted in a direction coaxial with the axis of rotation of the head unit and thus uniformly distributes the pressure over the entire clamping surfaces without causing any kanting or misalignment of the tool head.

Figure 2:
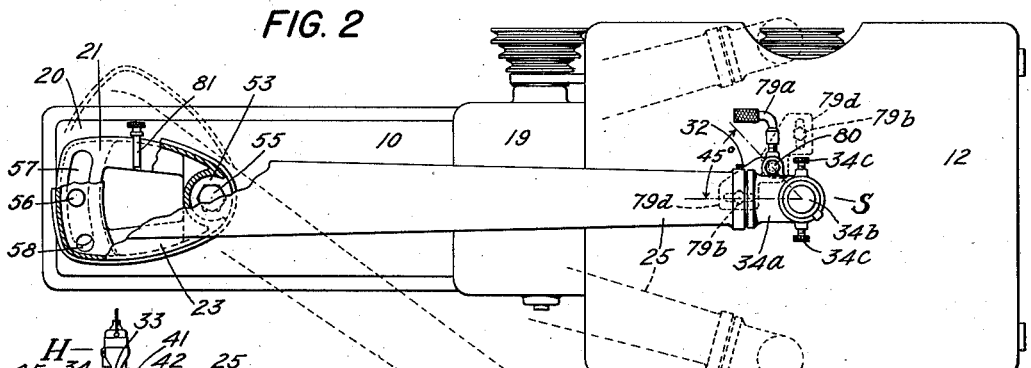
Fig. 2 is a plan view of the machine, partly broken away, illustrating a method of obtaining lateral movement of the arm and for clamping the arm in a predetermined position, and in dotted lines, a number of radial positions.

Figures 1 and 2 illustrate more clearly a preferred method of obtaining lateral movements of the arm and for clamping the arm in adjusted position. The surfaces 21 and 24 between the arm and the base are relatively large and lie in a plane parallel to the normal plane of the work surface and permit the arm and head to be swung out of the way when using saber blades.

The forward portion of the arm footing is recessed at 53 and apertured at 54 to accommodate a headed screw 55 which acts as the pivot point. Directly to the rear of the pivot and in a line intersecting the axis of the pivot and spindle, a clamp bolt 56 is threaded. The bolt 56 operates through an arcuate slot 57 and engages the underside of a transverse web in the base 10. Consequently when the arm is clamped, the clamping forces of the screws 55 and 56 act in the plane that includes the axis of the arm and head attachments and effect powerful clamping action.

With the jig saw head mounted upon the over-arm, the forces acting upon the outer end tend to bend the arm downwardly at the elbow. The present arm, however, is made substantially tubular and adequately ribbed and reinforced by radial transverse ribs 23a, 23b and 23c, and effectively resists the collapsing stresses. The long bearing surfaces 21 and 24 and widely spaced clamp bolts 55 and 56 effectively prevent any yielding at that point. The bed or base 10 is also reinforced against bending, by means of a long curved portion 10a which extends from the surface 24 to a point well toward the front of the base. With a long over-arm the spring tension exerts tremendous loads at the elbow of the arm and in the region 10a of the base and unless adequate precautions are taken the danger of collapse is imminent.

When using the machine as a router, head H attached, the forces incident to the tooling operation ordinarily are not so great as in jig sawing and usually act in the opposite direction.

As illustrated in Figure 2 the arcuate slot 57 at the wider end of the base permits a limited swinging movement of the arm to either side of the center, and the ends of the slot act as stops and prevent the user from swinging of the arm too far. Provision is also made for obtaining a greater movement of the arm at one side of the working surface than at the other which comprises a threaded hole 58 formed in arm member 23 at a point removed from the center line, into which the clamp bolt 56 may be inserted and operated as before. By moving the clamp bolt to the hole 58 the arm may be swung angularly a further distance, equal to the angular displacement of the hole 58 to one side of the center, and firmly clamped. Figure 2 of the drawings illustrates the expanded triangular form of the arm bearing surfaces and in dotted lines various radial positions the arm may assume, and in all positions the arm is supported upon long and wide surfaces. And since no parts project above the plane of the table, the user has ample available working space under the arm, in the present case approximately 24", and for extra large work the arm may be removed entirely. To restore the arm to its exact center position a locating pin 81 is provided which fits an aperture formed half in the base and half in the over-arm. When the two halves are in alignment, the pin may be inserted and the arm clamped in its centered position.

In cases where it is necessary to use the machine for fine fret work, etc., the jig-saw head S is attached to the arm and clamped in place by the clamp bolt 28. The jig-saw head illustrated in the fragmentary Figs. 4 and 5, comprises a bracket 34a provided with bearing surfaces 26a also adapted to fit the bearing surfaces at the free end of the over-arm, and is clamped thereto by the head clamp screw 28, that passes through the webbed hollow arm. The removable bracket 34a, carries a hollow reciprocable plunger 70, which projects from the lower end, and carries at its outer end a removable saw gripping chuck 71. A plunger retracting spring 72, seated at one end against an inner wall of the bracket 34a and at its opposite end against an adjustable plate 72a mounted upon the plunger 70, normally urges the plunger to its upper position whereby the saw blade 73 is kept tight. A pin 74 insertable in apertures 70a in the plunger, is provided for locking the plate 72a in a predetermined position relative to the plunger 70. The apertures 70a in the plunger are spaced from each other the distance between different lengths of standard blades, that is, approximately ½". For example, if a user desired to use a 4" blade, the pin is inserted in an aperture near the top of the plunger the result of which is to lower the chuck end the required distance without unduly loading the spring 72. If a 5" blade is to be used, the pin is inserted in a lower hole in the plunger which raises the chuck end the amount necessary to accommodate the 5" blade while nevertheless maintaining a given tension upon the spring. By this means, it will be seen blades of various lengths may be used in the machine, and each given its proper tension. On the other hand, if the user has unusually long blades, each end thereof may be inserted through the chucks 16 and 71 and gripped thereby at some intermediate point. The two chucks being hollow, and likewise the plungers 15 and 70, the portions of the blade beyond the chucks may extend within the hollow plungers. In this way extra long blades may be used and adjusted up or down as required. Plunger 15 is provided near its lower end with a transverse plug which keeps the lubricant from pumping up through the chuck 16.

The head end of the pin 74 projects beyond the periphery of the plate 72a into a longitudinal channel 75 formed in the inner wall of the housing portion 34b and serves as a guide means to keep the plunger, and in turn the saw blade, from turning. To turn the saw 90° or to some intermediate angle, each chuck is threaded to its respective plunger and equipped with a jam nut 16a and 71a whereby it may be rotated and locked in a predetermined angular position. Frequently used angles such as 90° and 180° are quickly determined by loosening the screws 34c and turning the casing 34b until other diametrically spaced holes 34d therein line up with the screws 34c.

Under the plate 72a, a washer 76 preferably of leather, is provided for the purpose of guiding the upper end of the plunger and for the further purpose of acting as a piston in the cylinder 77. On each down-stroke of the saw, the air within the cylinder is compressed and discharged through a small opening 78 in the bottom of the casing. The hole 78 is located at the front of the saw and directs a blast of air upon the work-piece directly in front of the saw, thus, removing chips and saw-dust from the work and keeping that space clear so the operator can properly guide the workpiece. Preferably the end of the spindle 70 is capped or plugged as at 70b, to minimize the tendency to blast air through the center of the spindle.

The jig-saw head S is also equipped with work hold-down and saw supporting means 79. In this instance the hold-down foot 67 and roller-guide 68 are supported from an extensible rod 80 which is adapted to be clamped to the head 34a in its proper elevated position, by a hand clamp means 79a.

The axis of the rod 80 is on a line 45° removed from the normal center line of the machine so that the guide-roller supporting plate 79d may be removed and replaced in an inverted position, thereby to position the guide-roller mechanism behind the saw when the latter is turned 90° from the position illustrated. Intermediate adjustments of the roller-guide may be obtained by the screw and slot means 79b and 79c.

Figure 3:
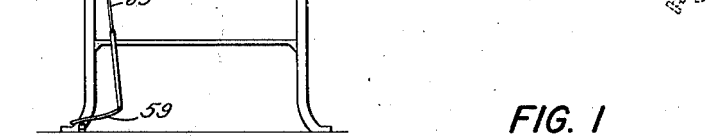
Fig. 3 is an assembly view, illustrating a pedestal mounting for the machine and a treadle operated feed for the router head.

The router tool head attachment H illustrated in Fig. 3 is described more fully in my parent application above referred to and comprises, essentially, a translatable sleeve member 33 mounted for reciprocation in a supporting bracket member 34. Each end of the sleeve member houses antifriction bearings which journal a rotatable spindle shaft 37. The outer surface of the sleeve is provided with rack teeth which mesh with a pinion on the pinion shaft 41. The pinion shaft is journaled in the bracket 34 and is provided at one end with a flanged hand wheel 42 and at its opposite end with a counterbalance mechanism. A spindle sleeve clamping means, operable by the hand lever 44 is also provided by the bracket 34 for clamping the spindle sleeve and thereby the tool spindle in a predetermined position as shown by the adjustable graduated depth gauge and stop mechanism 45.

A graduated dial 31, rotatable with the head, cooperates with a fixed pointer 32 to indicate the angle of adjustment.

To operate the machine as a router, the operator clamps the arm in the desired angular position, mounts the work upon the table, and by operating the hand wheel 42, feeds the cutter spindle assembly toward the work the required distance. Figure 3 of the drawings illustrates an alternative method of feeding the spindle which comprises a foot treadle 59, pulleys 60, 61 and 62, and a flexible cable 63. One end of the cable is wound around the flanged portion of the hand wheel 42 and the other end fastened to the treadle, the spring counterbalance means serving to keep the connections taught in all angular positions of the arm.

Certain types of work require the use of a router and a saw. For example, in the preparation of printing plates, an operator routs out sections or areas of the metal surface and then must trim the routed plate to a particular size. And so that it will be unnecessary for the user to take partly finished workpieces to a different machine for sawing, the machine of the present invention is arranged for both sawing and routing operations. For saw operations, the router assembly H is provided with a depending flanged member 64, to which may be secured a combined presser foot and back stop mechanism 65, the function of which is to hold the workpiece firmly to the table and to provide a rear support for the saw blade. Thus, with a router head mounted upon the arm, a saber blade saw may be inserted in the chuck 16 and reciprocated through the opening 17 in the table and the machine tool used in the normal way for sawing. Figure 3 of the drawings illustrates the hold-down mechanism swung out of the way. A guide fence 69 is provided for the guiding of pieces past the saw or under the routing tool.

When the sawing operation is completed, the saw is removed or dropped to a point below the surface of the table, the hold-down and saw guide mechanism swung out of the line of the routing spindle, and the machine is again ready for subsequent routing operations.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool combining a base member, a work supporting surface; tool operating mechanism mounted upon said base member below said working surface and adapted to operate a tool through an opening in said work surface; an arm member rising from and pivoted to said base member at a point removed from said tool operating mechanism and adapted for movement relative to the mechanism below the table, said arm member having a forwardly projecting portion overlying said work surface and provided at its free end with bearing surfaces; an auxiliary tool head attachment removably mounted upon said bearing surfaces; means carried by said arm member and operable at points removed from said tool operating mechanism and the tool head attachment for clamping said head to the bearing surfaces at the free end of said arm and said arm in a predetermined angular position with respect to said work surface.

2. A machine tool combining a base member; a horizontally extending arm member; a tool head assembly removably mounted at the free end of said arm, said assembly comprising a bracket member, a plunger reciprocably mounted in said bracket and adapted to project from one end thereof, and a spring member operatively engaging said plunger and normally urging said plunger to its retracted position; means for adjusting the position of said plunger in said bracket relative to the point of engagement of said spring member therewith thereby to vary the distance said plunger projects from said bracket while maintaining a predetermined tension on said spring; and means for removably mounting said bracket member and parts carried thereby to the free end of said arm member.

3. A machine tool combining a base member, a work supporting surface; tool operating mechanism mounted upon said base member below said working surface and adapted to be provided with a tool operable through an opening in said work surface, an arm member rising from said base member at a point removed from said tool operating mechanism, said arm member having a forwardly projecting portion overlying said work surface and spaced therefrom a predetermined distance and provided at its free end with bearing surfaces; a tool head removably mounted upon said bearing surfaces; a plunger reciprocably mounted in said head in cooperative relation with said tool operating mechanism, said plunger being provided with tool gripping means for holding one end of the tool operated by said tool operating mechanism; means carried by said removable head for applying a force directly on the plunger normally tending to move said plunger to a retracted position; means for adjusting the position of said plunger relative to said tool operating mechanism and to said head and to the point of application of said means for applying a force thereby to accommodate different lengths of tools; and means carried by said arm member and operable at a point removed from said head and tool operating mechanisms for clamping said head to the bearing surfaces at the free end of said arm.

4. A machine tool combining a work support; jig saw operating mechanism mounted below said support adapted to reciprocate a saw through an opening in said support; cooperating mechanism mounted above said support including a reciprocable hollow plunger, spring means normally tending to urge said plunger away from said support, a saw gripping chuck carried by said plunger operative to clamp a saw blade operated by the saw operating mechanism below the support whereby said plunger is moved in opposition to said spring; and means provided by said saw gripping chuck for passing a portion of the saw therethrough into said hollow plunger and for gripping the saw intermediate its ends whereby saw blades of different lengths may be used; and means for varying the range of effective movement of said plunger relative to said support while maintaining a predetermined spring tension upon the inserted saw.

5. An over-arm structure for a power jig-saw normally subjected to collapsing and bending stresses comprising a tapered tubular member having a relatively large horizontally disposed base portion at one end thereof, said tubular member extending upwardly from said base portion and then curving forwardly to form an L-shaped tapered over-arm adapted to support jig-saw operating mechanism at the free end thereof, and a plurality of rib members transversely disposed within said tubular member in the region of the curved portion thereof and extending in planes radiating from the general center of curvature of the curved portion for reinforcing the over-arm structure against collapsing stresses to which the over-arm normally is subjected.

6. An over-arm structure for a jig-saw comprising a tubular member having a relatively large horizontally disposed base portion at one end thereof, said tubular member extending upwardly from said base portion and then forwardly to form an L-shaped over-arm adapted to support tool operating mechanism at the free end thereof, bearing surfaces at the free end of said arm for receiving the tool operating mechanism, and a plurality of rib members transversely disposed within said tubular member in the region of the elbow portion thereof for reinforcing the over-arm structure against bending, at least one of said transverse ribs being located in said forwardly etxending portion and being bored to receive a clamp screw operative to clamp the tool operating mechanism to the bearing surfaces at the free end of said portion.

7. A jig-saw machine tool combining a base member; a horizontally extending arm member; a tool head assembly mounted at the free end of said arm, said assembly comprising a bracket member, a saw holding plunger reciprocably mounted in said bracket and adapted to project from one end thereof, and a spring member normally urging said plunger to its retracted position; a combined cover and guide element for said spring and plunger fitted to said bracket; guide means provided in part by said cover element and in part by said plunger for restraining said plunger against angular movement; and means for adjusting the angular position of said plunger relative to said bracket thereby to change the position of the plane of the saw while maintaining a predetermined tension on said spring comprising manually operable screw means operatively engaging said bracket and cover members normally maintaining said members in a predetermined position but operative to permit relative angular movement therebetween to change the plane of the saw.

8. A machine tool combining a base member; a work supporting surface at one end thereof; saw reciprocating mechanism underlying said work surface including a hollow saw receiving chuck; cooperating saw mechanism mounted above said work surface and in fixed relation thereto, comprising a bracket member, a hollow reciprocable shaft mounted in said bracket with the axis thereof in alignment with the chuck of said saw reciprocating mechanism, said shaft having a central bore provided therein unobstructed substantially its full length; a hollow saw receiving chuck at the end of said shaft adjacent said first mentioned chuck; and saw clamping means carried by said chucks operative to permit end portions of saws of random lengths to pass therethrough and through substantially the full length of said hollow shaft and to clamp the inserted saw at points intermediate its ends.

9. A machine tool combining a base member, a work supporting surface; tool operating mechanism mounted upon said base member below said working surface and adapted to be provided with a tool operable through an opening in said work surface; an arm member rising from said base member at a point removed from said tool operating mechanism, said arm member having a forwardly projecting portion overlying said work surface and spaced therefrom; a tool head carried at the free end of said arm; a plunger reciprocably mounted in said head in cooperative relation with said tool operating mechanism, said plunger being provided with tool gripping means for holding one end of the tool operated by said tool operating mechanism; means carried in said head for applying a force directly on the plunger at a point intermediate its ends normally tending to move said plunger to a retracted position; means for adjusting the position of the plunger relative to the head and said point of application of the said direct acting means for applying a retractive force to accommodate different lengths of tools, said adjusting means including means for locking said direct acting force applying means to the plunger in its adjusted position.

10. A machine tool combining a work support; jig-saw operating mechanism mounted below said support adapted to reciprocate a saw through an opening in said support; cooperating mechanism mounted above said support including a reciprocable plunger, spring means encircling and directly engaging said plunger at a point intermediate its ends normally tending to urge said plunger away from said support, a saw gripping chuck carried by said plunger operative to clamp a saw blade operated by the saw operating mechanism below the support whereby said plunger is moved in opposition to said spring through a stroke of a predetermined distance; and means for shifting said plunger relative to the said point of engagement of said spring means therewith to effect a corresponding change in the position of the stroke of the plunger relative to said support for accommodating blades of different lengths while maintaining a predetermined spring tension thereon.

WILLIAM FERDINAND OCENASEK.